United States Patent
Sykes et al.

(10) Patent No.: US 8,169,109 B2
(45) Date of Patent: May 1, 2012

(54) ELECTRICAL MACHINE WITH DUAL RADIAL AIRGAPS

(75) Inventors: Paul Andrew Sykes, West Yorkshire (GB); Phillip George Dickinson, North Yorkshire (GB)

(73) Assignee: Nidec SR Drives Ltd., North Yorkshire (GB)

(*) Notice: Subject to any disclaimer, the term of this patent is extended or adjusted under 35 U.S.C. 154(b) by 299 days.

(21) Appl. No.: 12/722,044

(22) Filed: Mar. 11, 2010

(65) Prior Publication Data
US 2010/0231062 A1 Sep. 16, 2010

(30) Foreign Application Priority Data
Mar. 13, 2009 (GB) .................................. 0904434.8

(51) Int. Cl.
*H02K 37/00* (2006.01)
(52) U.S. Cl. .......................... 310/46; 310/114; 310/266
(58) Field of Classification Search .................. 310/46, 310/114, 166, 168, 266, 251.1
See application file for complete search history.

(56) References Cited

U.S. PATENT DOCUMENTS

| | | | | |
|---|---|---|---|---|
| 5,260,635 A * | 11/1993 | Bahn | ............................. | 318/701 |
| 5,828,153 A | 10/1998 | McClelland | | |
| 6,452,302 B1 * | 9/2002 | Tajima et al. | ......... | 310/216.001 |
| 6,584,813 B2 * | 7/2003 | Peachee et al. | ................. | 68/23.6 |
| 7,560,845 B2 * | 7/2009 | Dickinson et al. | ...... | 310/216.004 |
| 2002/0047418 A1 * | 4/2002 | Seguchi et al. | ................ | 310/114 |
| 2002/0135255 A1 * | 9/2002 | Willliams et al. | ............. | 310/166 |
| 2004/0070301 A1 | 4/2004 | Mecrow | | |
| 2004/0232800 A1 * | 11/2004 | Seguchi et al. | ................ | 310/266 |
| 2007/0138896 A1 * | 6/2007 | Zhu | ............................. | 310/181 |
| 2007/0296299 A1 | 12/2007 | Qu et al. | | |
| 2011/0031841 A1 * | 2/2011 | Gieras et al. | ................... | 310/198 |

FOREIGN PATENT DOCUMENTS

| | | |
|---|---|---|
| EP | 0 601 818 A1 | 12/1993 |
| EP | 0 735 651 A1 | 3/1996 |
| EP | 0 980 599 B1 | 5/1998 |
| JP | 7-163105 | 6/1995 |
| WO | WO 98/50998 | 11/1998 |

OTHER PUBLICATIONS

Stephenson et al., "The Characteristics, Design and Applications of Switched Reluctance Motors and Drives," PCIM '93 Conference & Exhibition, Nürnberg, Germany, Jun. 21-24, 1993, Title page and pp. 1-31, 33-34 and 35-68.

Miller, "Electronic Control of Switched Reluctance Machines," Newnes, Power Engineering Series, Great Britain, 2001, 2 title pages and pp. 92-97.

Hultman et al., "Soft Magnetic Composites—Materials and Applications," IEEE, Feb. 2003, p. 516-522.

(Continued)

*Primary Examiner* — Thanh Lam
(74) *Attorney, Agent, or Firm* — Haynes and Boone, LLP (57) ABSTRACT

A switched reluctance machine has an array of poles attached to a stationary holding member to form a stator. The stator has no back-iron. The machine has two arrays of rotor poles, positioned on either side of the stator poles, and circumferentially aligned with each other. When a pair of rotor poles is aligned with a stator pole, a small airgap is formed at each end of the stator pole, across which flux can be driven to produce torque in a rotary arrangement or force in a linear arrangement. When the poles are in the unaligned position, the phase inductance is very low.

20 Claims, 8 Drawing Sheets

OTHER PUBLICATIONS

Alakula et al., "An Iron Composite Based Switched Reluctance Machine," IEEE / KTH Stockholm Power Tech Conference, Stockholm, Sweden, Jun. 18-22, 1995, pp. 251-255.

Duhayon et al., "Design of a high speed switched reluctance generator for aircraft applications," IEEE / KTH Stockholm Power Tech Conference, Jun. 18-22, 1995, 5 pages.

* cited by examiner

ELECTRICAL MACHINE WITH DUAL RADIAL AIRGAPS

The present invention generally relates to the design of electrical machines and in particular reluctance machines. It is particularly suited to switched reluctance machines.

Figure 1:
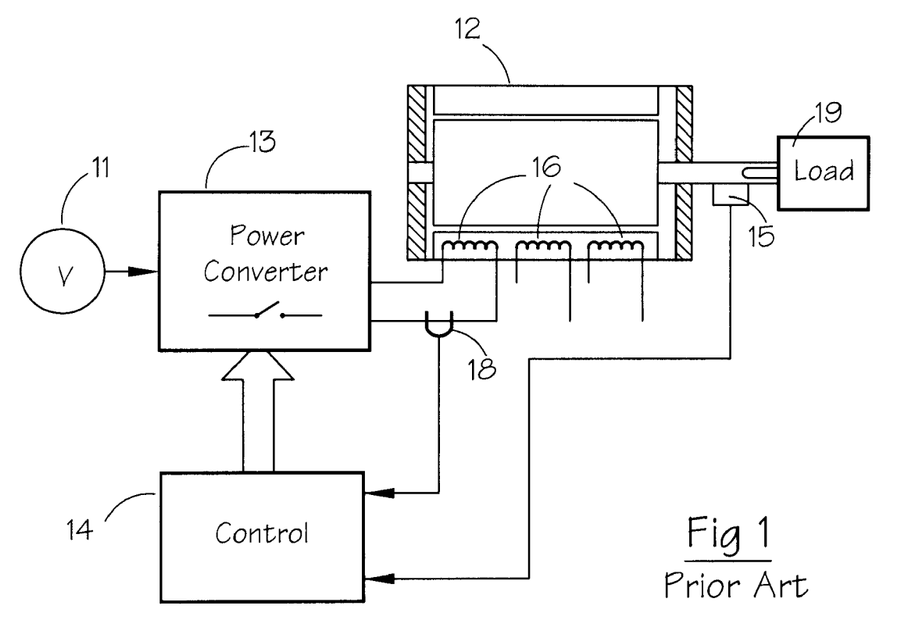
FIG. 1 shows a schematic drawing of a switched reluctance drive system.

The switched reluctance machine (whether operating as a motor or as a generator) is a form of variable reluctance machine. The characteristics and operation of switched reluctance systems are well known in the art and are described in, for example, "The characteristics, design and application of switched reluctance motors and drives" by Stephenson and Blake, PCIM'93, Nürnberg, 21-24 Jun. 1993, incorporated herein by reference. A general treatment of the drives can also be found in various textbooks, e.g. "Electronic Control of Switched Reluctance Machines" by T J E Miller, Newnes, 2001. FIG. 1 shows a typical switched reluctance drive in schematic form, where the switched reluctance machine 12 is connected to a load 19. The DC power supply 11 can be either a battery or rectified and filtered AC mains or some other form of energy storage. The DC voltage provided by the power supply 11 is switched across the phase windings 16 of the machine 12 by a power converter 13 under the control of the electronic control unit 14.

The switching must be correctly synchronized to the angle of rotation of the rotor for proper operation of the drive, and a rotor position detector 15 is typically employed to supply signals corresponding to the angular position of the rotor. Sensorless techniques for determining rotor position are also known to the person of ordinary skill in the art. Thus, the rotor position detector 15 may take many forms, including that of a software algorithm, and its output may also be used to generate a speed feedback signal. The presence of the position detector and the use of an excitation strategy which is completely dependent on the instantaneous position of the rotor leads to the generic description of "rotor position switched" for these machines.

Figure 2:
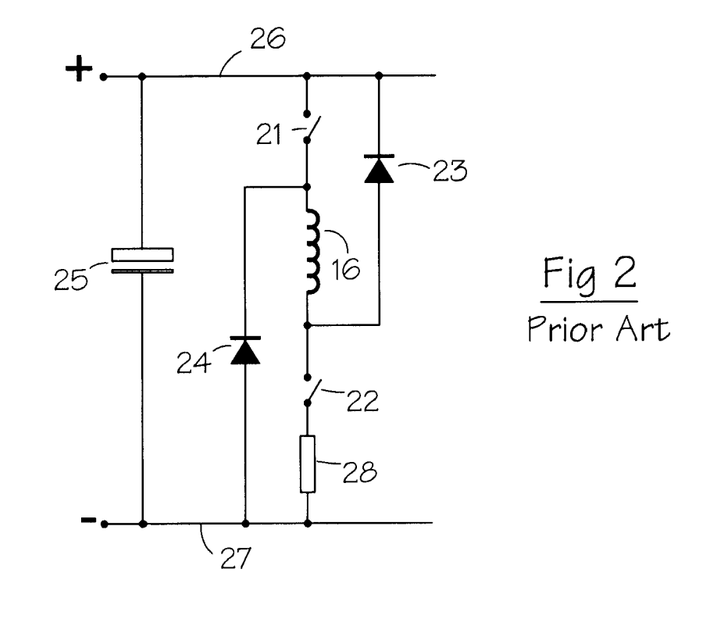
FIG. 2 shows a typical power circuit topology for one phase of the drive of FIG. 1.

One of the many known converter topologies is shown in FIG. 2, in which the phase winding 16 of the machine is connected in series with two switching devices 21 and 22 across the busbars 26 and 27. Busbars 26 and 27 are collectively described as the "DC link" of the converter. Energy recovery diodes 23 and 24 are connected to the winding to allow the winding current to flow back to the DC link when the switches 21 and 22 are opened. A capacitor 25, known as the "DC link capacitor", is connected across the DC link to source or sink any alternating component of the DC link current (i.e. the so-called "ripple current") which cannot be drawn from or returned to the supply. In practical terms, the capacitor 25 may comprise several capacitors connected in series and/or parallel and, where parallel connection is used, some of the elements may be distributed throughout the converter. A resistor 28 is connected in series with the lower switch 22 to provide a non-isolated current feedback signal. An alternative current measurement arrangement 18 giving an isolated signal is shown in FIG. 1. A multiphase system typically uses several of the "phase legs" of FIG. 2 connected in parallel to energies the phases of the electrical machine.

Figure 3A:
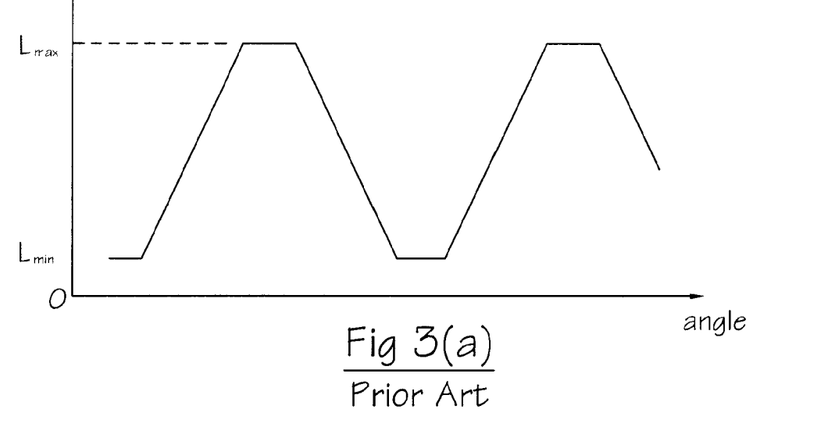
FIG. 3(a) shows an inductance profile of a phase winding of a typical switched reluctance machine.
Figures 3B, 3C:
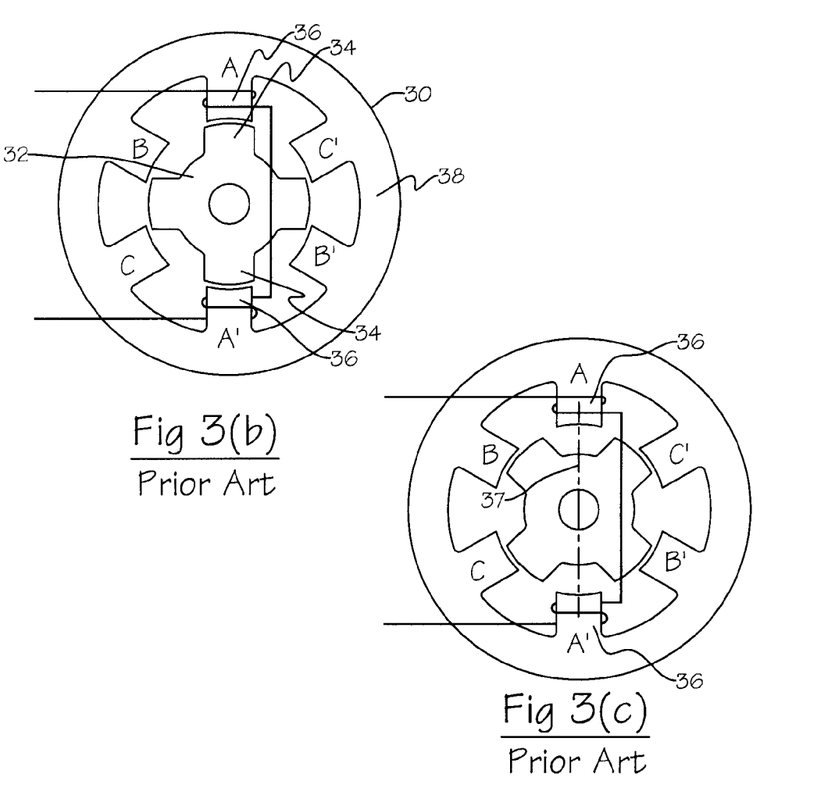
FIG. 3(b) shows a schematic cross-section of a switched reluctance machine.
FIG. 3(c) shows another schematic cross-section of a switched reluctance machine.

A cross-section of a typical 3-phase switched reluctance machine is shown in FIG. 3(*b*). The machine is doubly salient, i.e. both stator 30 and rotor 32 have magnetically salient poles. In FIG. 3(*b*) the rotor is shown with a pair of poles 34 fully aligned with the stator poles 36 of Phase A. This represents the position of maximum inductance of the phase, often denoted $L_{max}$, as shown in FIG. 3(*a*). In FIG. 3(*c*) the rotor has been rotated to the position where an inter-polar axis 37 of the rotor is aligned with the stator poles 36. This represents the position of minimum inductance, denoted as $L_{min}$. As the rotor rotates, the inductance varies between the extremes of $L_{max}$ and $L_{min}$, giving the idealized form shown in FIG. 3(*a*). In practice, the sharp corners at $L_{min}$ and $L_{max}$ are rounded due to flux fringing and to saturation of the magnetic circuits. The maximum value of inductance would also be current dependent. Nevertheless, this curve is useful to illustrate the general behavior of the machine.

The phase inductance cycle of a switched reluctance machine is the period of the variation of inductance for the, or each, phase, for example between maxima when the rotor poles and the relevant respective stator poles are fully aligned. Typically, the rotor and the stator have the same axial length and the flux paths within them are notionally the same at any cross-section along that axial length. The axial lengths of the cores are often denoted as the 'active length' of the machine, the end-turns of the windings lying outside the active length at both ends of the machine.

Figure 5A:
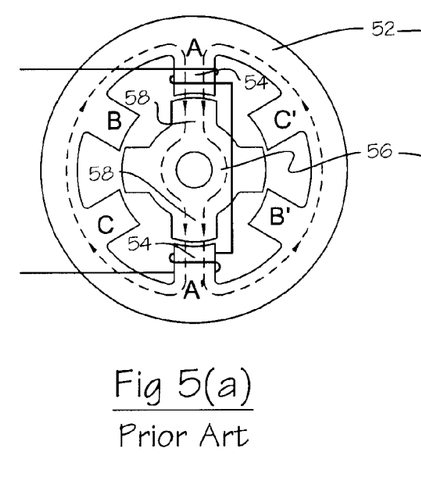
FIG. 5(a) shows flux paths in a typical cross-section of a reluctance machine in the aligned position.
Figure 5B:
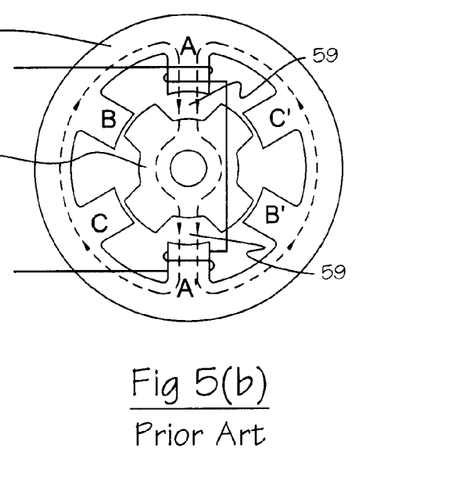
FIG. 5(b) shows flux paths in a typical cross-section of a reluctance machine in the unaligned position.

The machine shown in FIG. 3 has a common topology of a 6-pole stator and a 4-pole rotor but many other variants are known, eg 12 stator poles and 8 rotor poles, 8 stator poles and 6 rotor poles, etc. In all of these common variants, each stator pole has a single airgap associated with it in the $L_{max}$ position and the stator poles of a phase are connected to each other by the back iron 38 (or "yoke") of the stator. The idealized flux patterns in the aligned and unaligned positions are shown in FIG. 5 for excitation applied to Phase A and it will be noted that the flux path always includes the stator back iron 52, stator poles 54 and rotor back iron 56. Flux passes through the rotor poles 58 only when the rotor poles move towards the stator poles of the energized phase. It will also be clear from the unaligned position shown in FIG. 5(*b*) that the minimum inductance is heavily dependent on the length of the air path 59 from the stator poles to the rotor back iron 56.

It is well-known that the output of this type of machine is a function of, inter alia, the difference between the inductance in the aligned position (FIG. 3(*b*)) and that in the unaligned position (FIG. 3(*c*)). The skill of the designer is brought to bear on the task of maximizing this difference by increasing $L_{max}$ and reducing $L_{min}$. However, it is often found that altering the topology of the stator and rotor to maximize the aligned inductance (for example, by widening the pole bodies and arcs) compromises the unaligned inductance, and vice versa. Often a compromise has to be drawn between the conflicting issues arising in the overall design for the machine.

Electrical machines in general are constructed from laminations of electrical sheet steel, the resulting structure being used to carry the magnetic flux on which the machine depends for its operation. The structure is laminated to reduce the effect of eddy currents, which flow in the steel due to the time rate of change of the flux. Usually only machines with unvarying flux have unlaminated structures. For example, the field structure of a dc machine can be unlaminated (i.e. solid), though even in these machines a laminated structure is often adopted in order to reduce the transient response when moving to a new operating condition. The degree of lamination is influenced by the frequency of flux variation in the machine. For example, in a machine energized directly from the 50 or 60 Hz mains supply and operating at, say, 1500 or 1800 rev/min, a lamination thickness of 0.50 or 0.65 mm is often adopted. For a machine operating on a 400 Hz supply and running at 12000 rev/min, a lamination thickness of 0.20 mm might be selected.

Of course, the decreasing lamination thickness brings many disadvantages, not least in terms of cost of material and of manufacturing difficulty, but the designer is usually prepared to accept these handicaps in order to gain the benefits of reduced eddy current loss, higher efficiency and higher specific output.

The output of the machine is also dependent on the so-called magnetizing characteristic of the steel used. This is the relationship between the magnetizing effort applied to the steel (i.e. the magneto motive force, mmf) and the flux consequently produced. While there is a range of grades of steel from which the designer can choose, all of them have the same general feature in that the initial, generally linear, relationship between mmf and flux gradually deteriorates with increasing mmf to the point of significant non-linearity. In practical terms, this represents a limit on the amount of flux that the steel can usefully carry—a state generally described as "saturated", though this is not a particularly descriptive term, as there is no sharp cut-off in the relationship.

Figure 4:
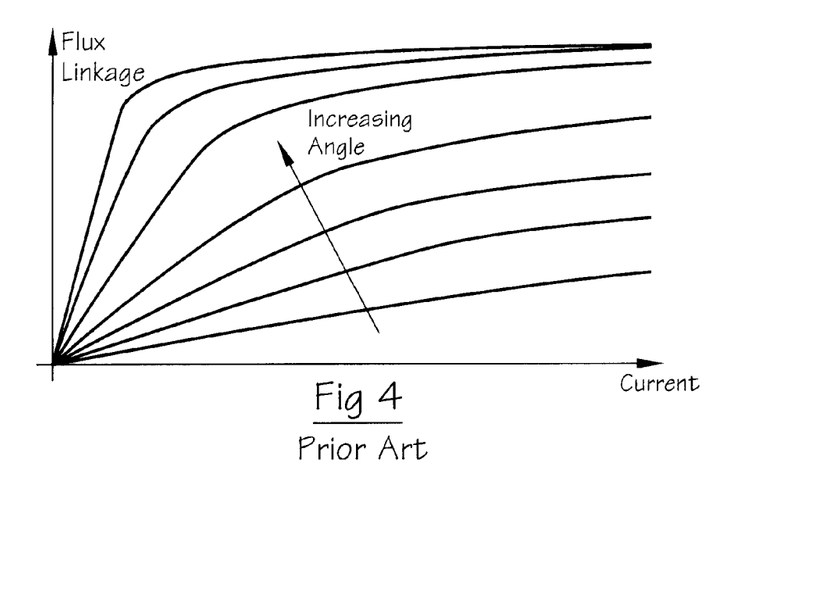
FIG. 4 shows the flux-linkage and current relationship for a typical switched reluctance machine as a function of rotor position.

This magnetizing characteristic of the steel becomes inseparably interrelated with the ideal characteristics of any machine in which the steel is used. For example, in a switched reluctance machine, the ideal inductance profile (discussed in the Stephenson paper above and shown in FIG. 3(a)) takes on the steel characteristics and is significantly modified. This can be seen in the flux-linkage/angle/current relationships shown in FIG. 4, where the non-linearity of flux with current is immediately evident.

In general, the designers of electrical machines are under great pressure to design smaller and less costly machines to meet ever more demanding performance specifications. Size is important because it generally relates to both weight and cost, parameters which are important in the fields of, for example, aerospace and automobiles where fuel consumption is increasingly regarded as a major issue. At first sight, reducing the size for a given performance is simply achieved by working the steel harder, i.e. making it carry more flux in the given volume. Inspection of the curves of FIG. 4, however, shows that this results in a non-linear increase in the mmf, resulting in a non-linear increase in the ohmic losses of the machine and therefore in the thermal management problems associated with cooling. There is likely to be a consequential increase in the cost of the power converter for the machine. Thus there is clearly a practical limit that applies to the specific output of the machine.

U.S. Pat. No. 5,828,153 (McClelland), incorporated herein by reference, discloses a rotor of laminated material in a particular type of switched reluctance machine with an external rotor.

Attempts to reduce $L_{min}$ by changing the direction of the flux path are generally hampered by the need to laminate the material to contain the losses. US Patent Application No 2004/0070301 (Mecrow), incorporated herein by reference, discloses an arrangement of rotor segments which have to be assembled on a shaft. These systems inevitably introduce mechanical complexity into the rotor design.

Attempts have been made to use pairs of conventional stators and rotors acting in consort to improve performance. For example, JP 07163105 by Deguchi uses two stators, each with their own windings, which share the same back-iron flux paths and co-operate with two commonly connected rotors. Vibration of the stator assembly is said to be controlled by exciting an outer one of the two stator windings based on a signal from an accelerometer. A different arrangement in Luk et al (Yokeless switched reluctance motors, PESC 2006, Power Electronics Specialists Conference, Jeju, South Korea, 18-22 Jun. 2006) uses pairs of laminated, C-core shaped assemblies arranged about a ring of rotor poles to provide a motor for an electric vehicle.

There is therefore an ongoing need for a cost-effective rotor design which reduces $L_{min}$ without significantly reducing $L_{max}$.

Soft magnetic composite (SMC) material is a magnet sable material based on iron powder. It is generally pressed into the required finished shape rather than being punched and/or machined. Developments in powder metallurgy techniques have produced bonding agents which coat the iron powder and keep the resistivity high, so that the eddy currents in the material are reduced when the material is exposed to time varying flux. The material can be placed into a die and pressed to form the required component at pressures up to 800 MPa. The resulting components are then subjected to heat treatment at temperatures up to 500° C. A summary of material properties is given in "Soft Magnetic Composites—Materials and Applications", Hultman & Jack, IEMDC Conference, Madison, Wis., USA, 1-4 Jun. 2003, Vol 1, pp 516-523, which is incorporated herein by reference.

In recent years, prototype designs have been proposed for permanent magnet, synchronous and reluctance machines which employ SMC material in some parts of the magnetic circuit. For example, "An Iron Composite Based Switched Reluctance Machine", Alakula et al, Stockholm Power Tech, 18-22 Jun. 1995, Vol 3, pp 251-255, incorporated herein by reference, replaces the conventional laminations with SMC material, keeping the basic magnetic geometry unchanged. This project, however, failed to demonstrate any advantage over a conventional machine. A similar approach was taken in the work reported in "Design of a High Speed Switched Reluctance Generator for Aircraft Applications", Duhayon et al, ICEM 2002, International Conference on Electrical Machines, 25-28 Aug. 2002, Brugge, Belgium, incorporated herein by reference. In general, it has been the intention of these designers to produce an item at least partly in SMC that is a mechanical, as well as functional, equivalent of a pre-existing rotor.

The inventors have appreciated that the application of SMC to switched reluctance structures requires a radical change in the conventional shapes of the stator and rotor in order to exploit the properties of the material and produce an improved machine.

The present invention is defined in the accompanying independent claims. Preferred features of the invention are recited in the claims respectively dependent thereon.

A reluctance machine according to embodiments of the invention comprises a stator and rotor arranged for rotation relative to the stator about an axis. The rotor has an inner rotor portion and an outer rotor portion. The inner rotor portion has outwardly projecting inner rotor poles and the outer rotor portion has inwardly projecting outer rotor poles, projecting from a respective inner and outer core portion. Thus, a gap of circumferentially varying radial width is defined between the inner and outer rotor portions. The stator has stator poles circumferentially disposed within the gap and each stator pole has an inner stator pole face facing the inner rotor portion and an outer stator pole face facing the outer rotor portion.

In can be seen that embodiments of the invention therefore provide a novel topology for a reluctance machine, such as switched reluctance machine, which has dual radial air gaps, one air gap on each side of the stator pole. Accordingly, the total flux path through air is twice as large as if only one of the inner or outer core portions were present and, hence, the difference between $L_{min}$ and $L_{max}$ is relatively increased, resulting in improved torque production as explained above.

A first torque generating flux path is defined by a pair of stator poles, a pair of inner rotor poles and a pair of corresponding outer rotor poles, a portion of the outer core portion and a portion of the inner core portion. A further torque generating flux path, perpendicular to the first one may be defined by each stator pole, an inner rotor pole, a corresponding outer rotor pole, a portion of the outer core portion, a portion of the inner core portion and a portion of an end portion connecting the inner and outer core portions.

The stator poles may be secured to a holding structure, for example by securing a feature of each stator pole to the holding structure. The holding structure may substantially consist of non-magnetic material, thereby, in effect, eliminating any leakage flux into the holding structure. Torque-generating flux paths through the stator may be substantially limited to the stator poles.

One or both of the stator poles and rotor may include or be manufactured from soft magnetic composite material, conveniently allowing the required shapes to be formed in a mould.

In some embodiments, a machine may, in effect, comprise two machines as described above mounted back to back. For example, the machine may have further inner and outer rotor portions defining a further gap of circumferentially varying radial widths. Likewise, such a machine has further stator poles circumferentially disposed within the further gap such that the inner and outer stator poles faces of each stator pole face, respectively, further inner and outer rotor poles. Specifically, all rotor portions may be connected by a common end portion connecting the further inner core portion, the further outer core portion, the inner core portion and the outer core portion. This allows the (in effect) two rotors of the machine to be manufactured as a single motor component in one piece. Alternatively, the two rotors may be defined by a separate rotor component each. This allows the two rotors to be mounted with the respective gaps facing each other and the stator poles to be supported on a common, central holding structure. A stator pole and a corresponding further stator pole may be provided by a single stator pole member extending into each gap, on either side of the central holding structure. Conveniently, this allows the two stator poles of each stator pole member to be energized by a single winding linking the stator pole member.

The two rotors may be disposed in a fixed relationship to each other, for example by fixedly securing them to a common shaft. The poles of the two rotors may then be circumferentially offset relative to each other, which can lead to torque smoothing as the torque profile of one rotor fills in troughs in the torque profile of the other rotor. Alternatively, the two rotors may be rotatable relative to each other, allowing them to run at different speeds or in different directions.

Other aspects and advantages of the invention will become apparent upon reading the following detailed description of exemplary embodiments of the invention and upon reference to the accompanying drawings, in which:

In order to achieve a large reduction of $L_{min}$ (and hence increase the torque produced for a given excitation), the invention uses an entirely new topology for the stator and rotor. Instead of the stator having a back-iron from which poles extend, the stator poles are isolated magnetic components. To hold them in their desired spatial locations, they are mounted to a stationary holding structure. The holding structure may or may not be ferromagnetic, but is not designed to carry any of the main working flux of the machine.

It is possible to combine all the stator poles and the holding structure into one molded component, though this may make the assembling of coils to the structure more expensive. A choice would be made by evaluating the options for any particular design.

In order to provide a flux path to both ends of the stator poles, the rotor has features which co-operate with the stator poles to provide a low reluctance flux path in the aligned positions and to provide a very high reluctance path in the unaligned positions.

Figures 6A, 6B:
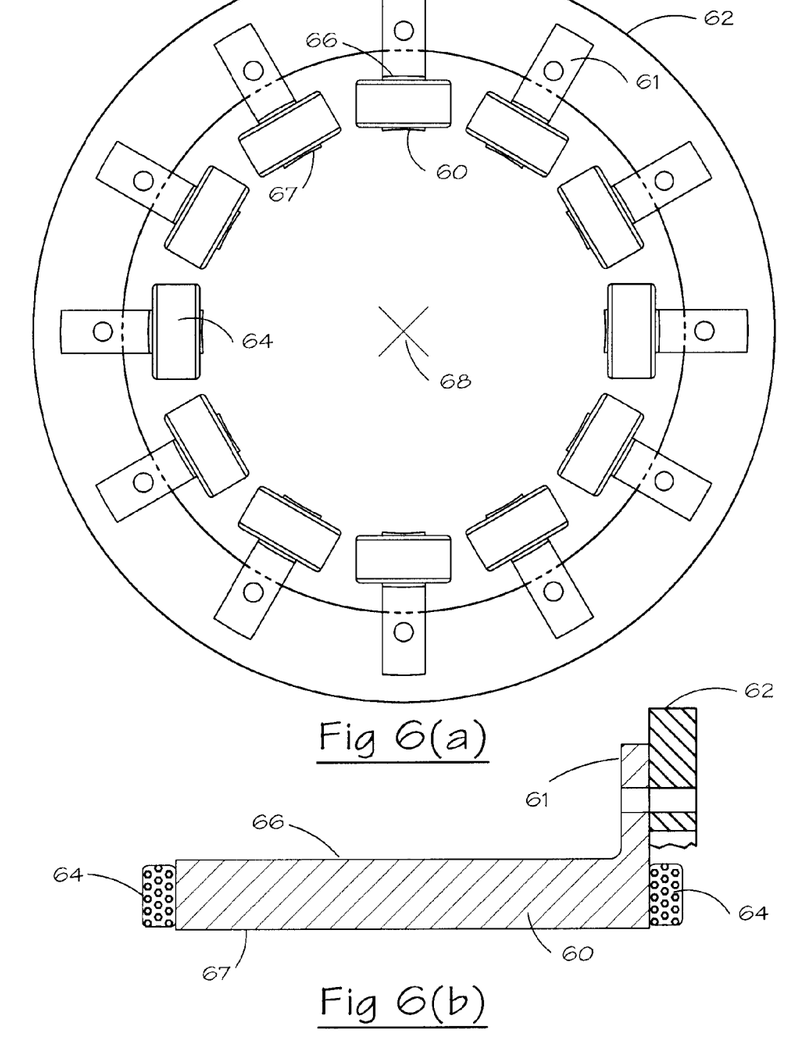
FIG. 6(a) shows an array of stator poles according to one embodiment.
FIG. 6(b) shows an axial cross section of a stator pole of FIG. 6(a)

A first embodiment of a stator is shown in FIG. 6. FIG. 6(a) shows an array of stator poles 60. The poles can be made from laminations of electrical sheet steel, but a preferred option is to mould them from a soft magnetic composite (SMC) material, e.g. Somaloy™500. The poles each have a feature 61 at one end which allows the poles to be secured to a stationary holding member 62. FIG. 6(b) shows a pole in axial cross section, wound with a coil 64. The coil is composed of a number of turns of insulated wire, as commonly used for electrical machines and substantially extends radially from one pole face to the other. The pole faces 66 and 67 are arcuate, with their centres coinciding with the centre 68 of the array of poles. The coils 64 on the poles 60 are connected in conventional fashion to form phase windings. In this exemplary case with 12 poles, the coils could be connected in groups of four to form three phase windings or in pairs to form six phase windings.

Figure 7A:
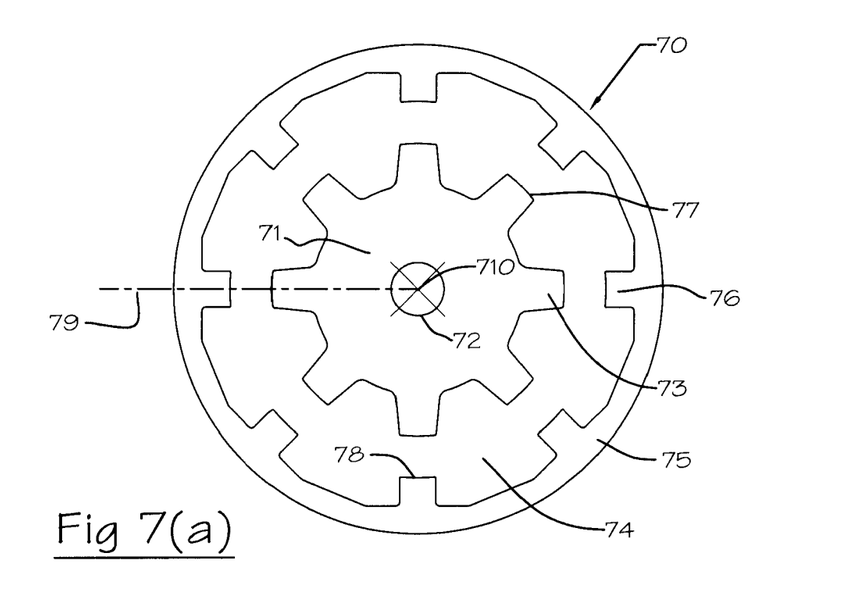
FIG. 7(a) shows an axial view of a rotor according to one embodiment.
Figure 7B:
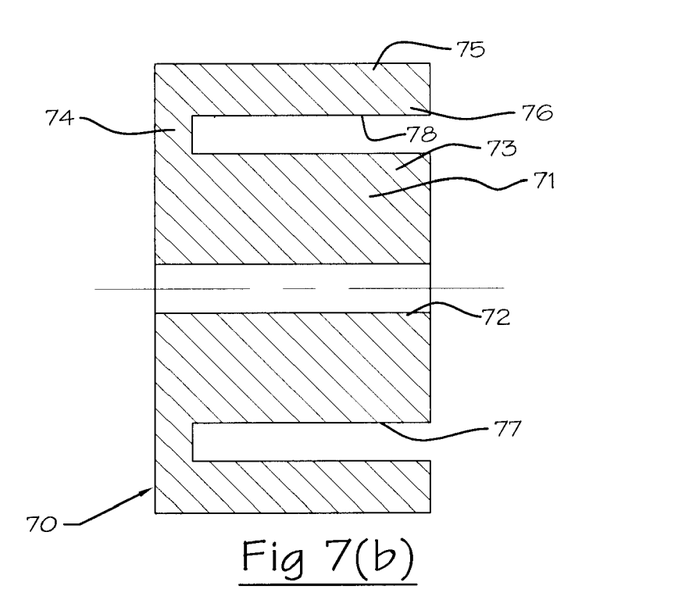
FIG. 7(b) shows a vertical cross section of the rotor of FIG. 7(a)

A first embodiment of a rotor 70 is shown in FIG. 7. FIG. 7(a) shows an axial view and FIG. 7(b) shows a vertical cross section. The rotor has the following features:

An inner core 71, which has provision 72 for mounting on a rotatable shaft;

A first array of rotor poles 73 extending radially outwards from the inner core, the array being centred on the axis of rotation of the rotor, the poles having arcuate faces 77 whose centres coincide with the centre 710 of the array;

An outer core 75;

A second array of rotor poles 76 extending radially inwardly from the outer core, the array being centred on the axis of rotation of the rotor, the poles having arcuate faces 78 whose centres coincide with the centre 710 of the array;

An end piece 74 which couples the inner core 71 to an outer core 75;

The two arrays have the same number of poles and they are aligned on the same radial lines 79 from the centre of the arrays.

While the rotor can be made from individual pieces and fastened together, it is preferable to mould the entire rotor from SMC. However, in some embodiments, the outer core 75 and inner core 71 are made from separate pieces and fastened together, for example by securing each core separately to the rotatable shaft, so that the outer core 75 and the inner core 71 are disposed in a fixed relationship relative to each other. In some embodiments, the rotor poles are made from individual pieces fastened to the rotor. It is emphasized that, whatever method of construction is chosen, the rotor shown in FIG. 7 is one piece and the features shown are fixed in relation to each other.

Figures 8A, 8B, 8C:
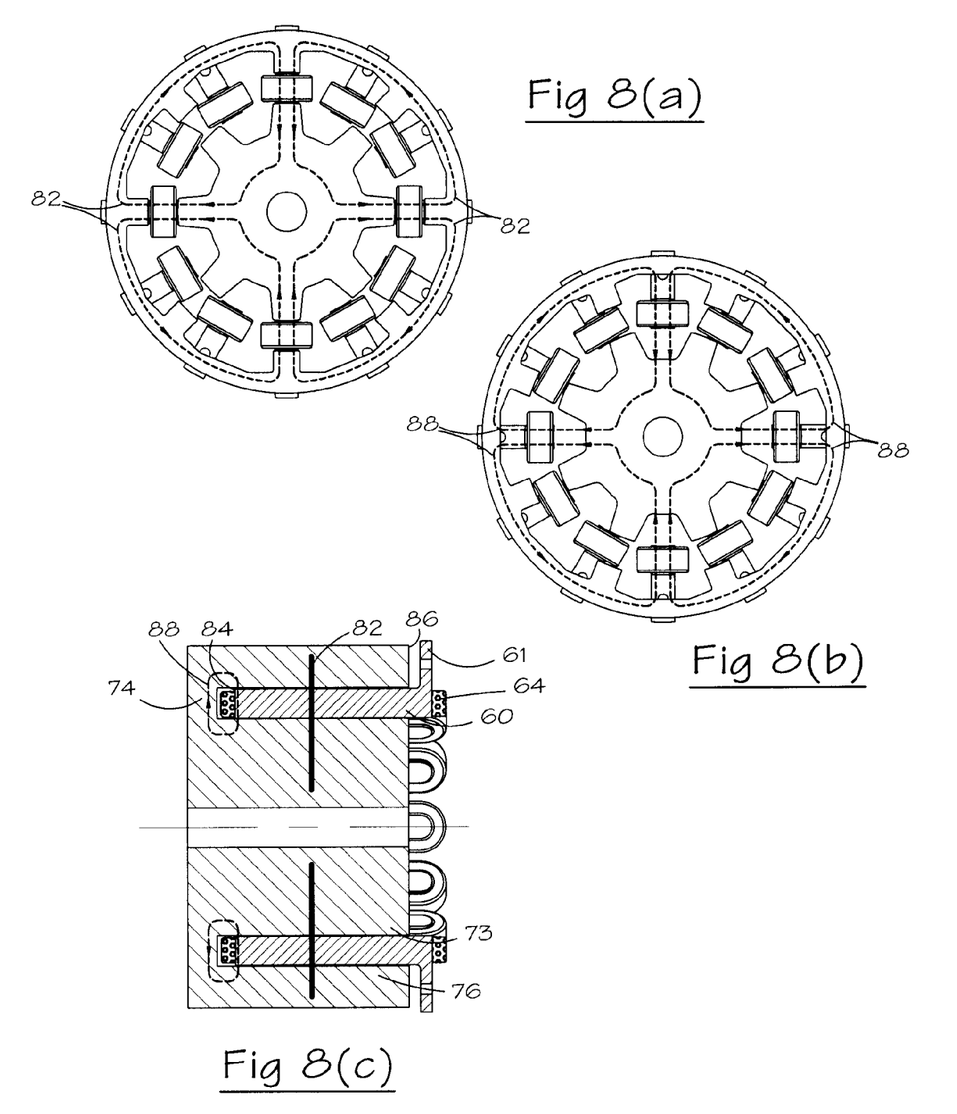
FIG. 8(a) shows a machine according to an embodiment in a maximum inductance position.
FIG. 8(b) shows a machine according to an embodiment in a minimum inductance position.
FIG. 8(c) shows a cross section of the machine in FIG. 8(a)

FIG. 8 shows the assembly of the stator of FIG. 6 and the rotor of FIG. 7. The stationary holding member 62 and some hidden detail is omitted for clarity. The 12 coils on the 12-pole stator are connected in sets of 4 to provide a 3-phase system and to co-operate with the 8-pole rotor. FIG. 8(*a*) shows an axial schematic view of the machine in the aligned ($L_{max}$) position and it will be seen that each of the four flux paths 82 (shown dotted for one phase) passes through the four stator poles, the corresponding inner and outer rotor poles and the inner and outer cores of the rotor. The flux passes through two airgaps for each stator pole in the magnetic circuit. Unlike a conventional topology, there is no stator back-iron so, if the holding member 62 is non-ferromagnetic, the only stationary parts to carry flux are the stator poles. Even if the holding member is capable of carrying flux, it will have a relatively high reluctance compared to the main flux paths around the rotor poles, so the amount of flux flowing will be very small.

FIG. 8(*c*) shows an axial cross section of the machine in this maximum inductance position. The flux path 82 now appears as a line. The axial boundaries of these main, idealized, flux paths are the end face 84 of the stator pole and the end face 86 of the rotor. While the paths shown are idealized, in practice the flux paths will extend into any convenient adjacent area of low permeability. In particular, there will be paths shown as dashed line 88 through the stator pole 60, the corresponding two airgaps, the rotor poles 73 and 76, and the end piece 74. Note that this does not denote a leakage flux path, since the flux crosses the working airgaps and therefore produces torque in the desired direction. Note also that the plane of this flux path 88 is at right angles to the plane of flux path 82. This is an important feature of this topology.

FIG. 8(*b*) shows the machine in the unaligned position for the same phase as described in FIG. 8(*a*). In this position, the main flux paths do not include either the inner or the outer rotor poles, so the air gap path at both ends of each stator pole is very long and, consequently, the minimum inductance $L_{min}$ is very low. This reduction in minimum inductance results in a significant improvement in the performance of machines constructed according to the invention.

In use, the phase windings can be connected to a power source via power switches, under the control of a system using rotor position feedback, as typically shown in FIG. 1.

While the rotor is described as being moulded from SMC it could be formed in other ways, such as machining. Likewise, the material can be any unlaminated magnet sable material other than the Somaloy™500 described.

The number of poles and the number of rotor poles and the number of phases can be chosen according to established design rules in the art. For example, the Stephenson paper cited above describes design rules which guide the designer in these choices. The invention is not limited to the exemplary 12 stator pole/8 rotor pole/3 phase arrangement described above. Likewise, not every stator pole needs to have an associated coil and a single coil may generate flux in more than one stator pole. The coil can extend over only a portion of the radial extent of the stator pole.

Figure 9A:
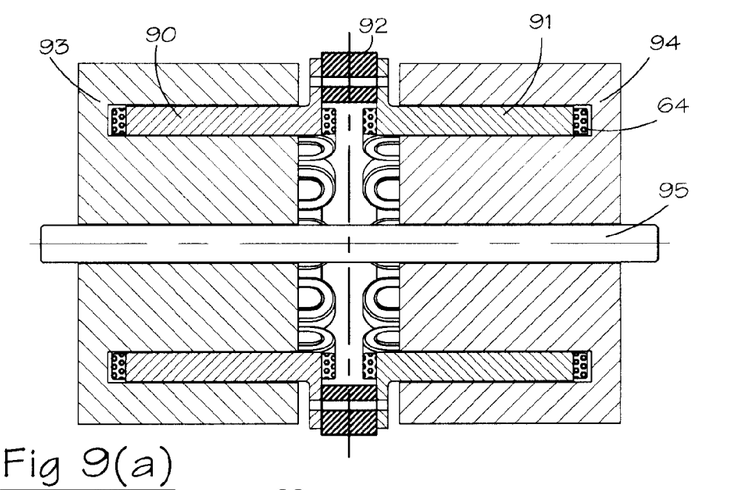
FIG. 9(a) shows a machine according to another embodiment.

Another embodiment is shown in FIG. 9(*a*), where hidden detail is omitted for clarity. This can be considered as two machines as shown in FIG. 8(*c*) arranged back to back. The arrays of stator poles 90, 91 can be identical and can have identical windings. The arrays are commonly mounted to a stationary holding member 92. The rotors 93, 94 are commonly mounted on a shaft 95 and rotate in bearings (not shown). The advantage of this arrangement is that the axial length of the stator poles can be limited. Not only does this make the part easier to manufacture, since there is a limit on the aspect ratio of moulded parts, but it also reduces the susceptibility of the poles to deflect from their desired position under any cantilever forces which may be present due to manufacturing defects.

Figure 9B:
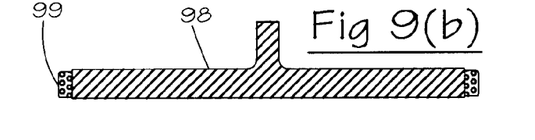
FIG. 9(b) shows a stator pole with a central mounting.

The phase windings associated with the arrays of stator poles 90, 91 can be supplied from the same power converter, in which case the arrays of stator poles on the holding member 92 should be circumferentially aligned and the arrays of rotor poles on the two rotors 93, 94 should also be circumferentially aligned. In use, the two rotors would contribute equally to torque production at the same instants. In this embodiment, the pairs of poles on either side of the holding member 92 can have a single coil 99 spanning the two poles and the two poles can be combined into one unit 98, as shown in FIG. 9(*b*). This has the advantage of reducing the number of stator pole components and coils required.

In another embodiment, the array of stator poles 90, 91 are circumferentially offset from each other by an angle and the array of rotor poles on the two rotors 93, 94 are circumferentially offset from each other by the same angle.

In other embodiments, the arrays of stator poles 90, 91 can be supplied from two different power converters. One of these embodiments uses identical windings on the arrays of stator poles and identical power converters, but the arrays of poles are mutually circumferentially displaced and the power converters are operated with a corresponding phase difference, so that the torque contributions from the two rotors are displaced in time. This can be used to modify the angular profile of the torque generated by the machine, e.g. the torque ripple may be reduced. In another embodiment, the power converters are supplied from different voltages and the windings of the two arrays of stator poles have different numbers of turns in the coils. This allows excitation of the machine from two separate voltage sources, either separately or simultaneously.

Figure 9C:
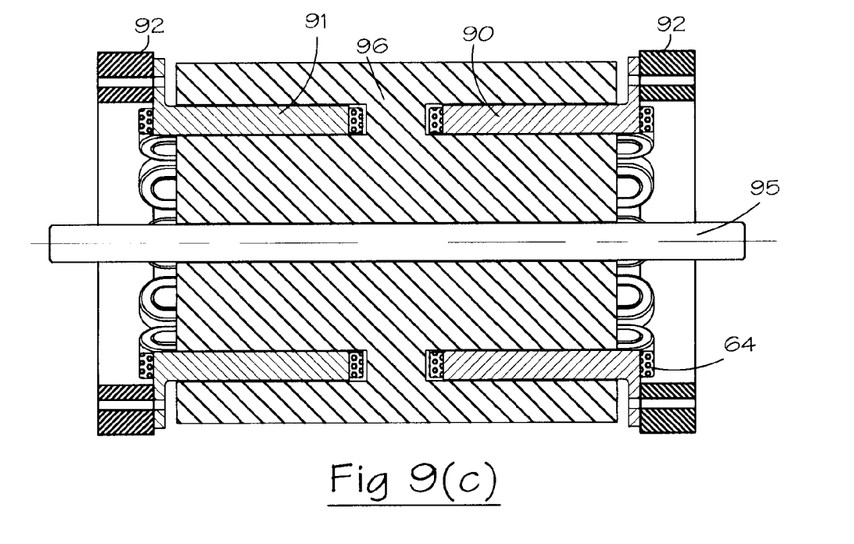
FIG. 9(c) shows a machine according to a further embodiment.

In another embodiment, shown in cross section in FIG. 9(*c*), a common rotor component 96 is provided in the centre of the machine, with two arrays of rotor poles 93, 94 extending axially outwards and co-operating with two arrays of stator poles 90, 91. As described above, the arrays of poles can be aligned or offset and the windings can be identical or dissimilar, giving the benefits described above. The benefit of this embodiment is that a single rotor component can be used, leading to manufacturing economy.

Figure 10:
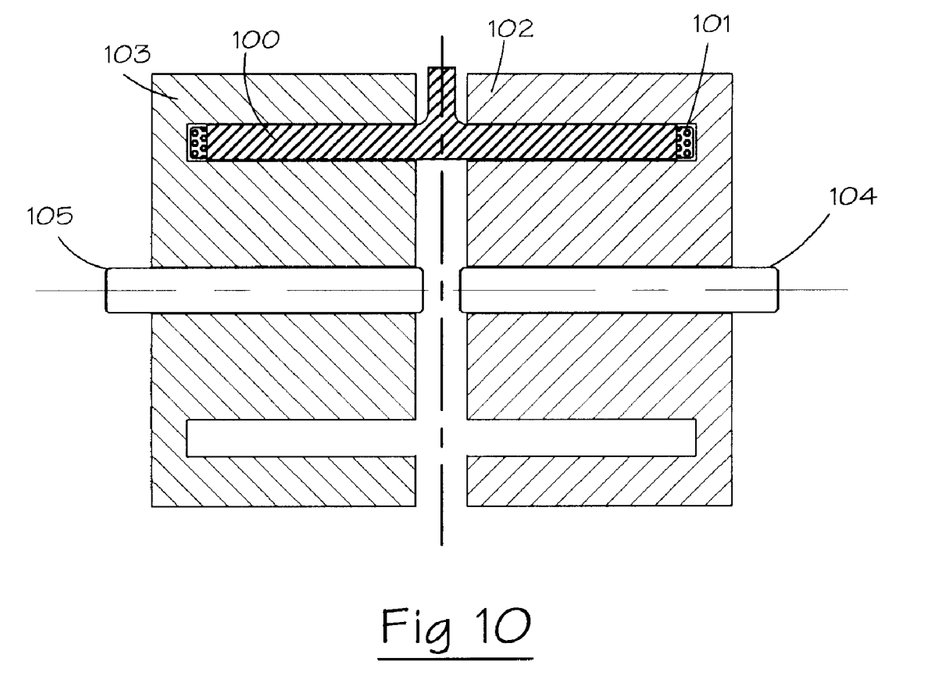
FIG. 10 shows a machine with independently rotatable rotors.

In other embodiments, a single array of stator poles is arranged to co-operate with two rotors which are individually mounted on two shafts and are free to rotate independently of each other. One such arrangement is shown in FIG. 10, where a pair of stator poles 100 is each embraced by a single coil 101. As in previous embodiments, the array of (pairs of) poles is supported by a stationary holding member, not shown here. The array of poles co-operates with two rotors. A first rotor 102 is mounted to rotate on a first shaft 104 and a second rotor 103 is mounted to rotate on a second shaft 105. The rotors and shafts are co-axial, but not mechanically connected. Since the stator is common to the two independent rotors, there are some constraints on the pole and phase combinations available.

In one embodiment, the rotor and stator pole numbers are equal, giving a 1-phase arrangement. All the stator poles are excited simultaneously but, if the rotors are placed in correct starting positions, the rotors will rotate in opposite directions. Many such techniques exist for ensuring the correct initial position, mainly based of the use of starting magnets, e.g. as in EP 0735651 or EP 0601818. In another embodiment, the stator pole number is twice the rotor pole number and the windings are grouped into two phases. Since the direction of starting of a 2-phase switched reluctance machine can be determined by profiling the rotor pole face, the pole faces of the two rotor pole arrays can be profiled in opposite directions, thus allowing the rotors to start in opposite directions.

In all of these embodiments the machine can operate with the stator poles magnetically isolated from each other, unlike conventional machine topologies where the poles extend from a ferromagnetic back iron.

While the invention has been described in terms of a rotating machine, the invention is equally applicable to a linear machine having a stator in the form of a track and a moving part moving on it. The word "rotor" is used in the art to refer to the movable part of both rotating and linear machines and is to be construed herein in this way. Similarly, terms like "circumferential", "radial", "outer" and "inner" are to be construed accordingly as "along the track", "across the track" and "either side of the track". Accordingly, the above description of several embodiments is made by way of example and not for the purposes of limitation to rotating systems.

The skilled person will appreciate that variations of the disclosed arrangements are possible without departing from the invention. Accordingly, the above description of several embodiments is made by way of example and not for the purposes of limitation. It will be clear to the skilled person that minor modifications can be made to the arrangements without significant changes to the operation described above. The present invention is intended to be limited only by the scope of the following claims.

What is claimed is:

1. A reluctance machine including
a stator and
a rotor arranged for rotation relative to the stator about an axis and having an inner rotor portion and an outer rotor portion, the inner rotor portion having inner rotor poles projecting outwards from an inner core portion, and the outer rotor portion having a corresponding outer rotor pole for each inner rotor pole, the outer rotor poles projecting inwards from an outer core portion, thereby defining a gap of circumferentially varying radial width between the inner and outer rotor portions,
wherein the stator has stator poles circumferentially disposed within the gap, each stator pole having an inner stator pole face facing the inner rotor portion and an outer stator pole face facing the outer rotor portion.

2. A machine as claimed in claim 1, in which a torque-generating closed flux path consists of flux path portions within a pair of stator poles, a pair of inner rotor poles and a pair of corresponding outer rotor poles, a portion of the outer core portion, a portion of the inner core portion and respective gaps between the inner stator pole faces of the pair of stator poles and the inner rotor poles of the pair of inner rotor poles and the outer stator pole faces of the pair of stator poles and the outer rotor poles of the pair of outer rotor poles.

3. A machine as claimed in claim 1 in which the outer and inner core portions are connected by an end portion.

4. A machine as claimed in claim 3, in which a first torque-generating closed flux path consists of flux path portions within a pair of stator poles, a pair of inner rotor poles and a pair of corresponding outer rotor poles, a portion of the outer core portion, a portion of the inner core portion and respective gaps between the inner stator pole faces of the pair of stator poles and the inner rotor poles of the pair of inner rotor poles and the outer stator pole faces of the pair of rotor poles and the outer rotor poles of the pair of outer stator poles; and a second torque-generating closed flux path consists of flux path portions within a stator pole of the pair of stator poles, an inner rotor pole of the pair of inner rotor poles, a corresponding outer rotor pole, a portion of the outer core portion, a portion of the end portion, a portion of the inner core portion and respective gaps between the inner stator pole face of the stator pole of the pair of stator poles and the inner rotor pole of the pair of inner rotor poles and the outer stator pole face of the stator pole of the pair of stator poles and the corresponding outer rotor pole, the second torque-generating flux path being at right angles to the first torque-generating flux path.

5. A machine as claimed in claim 1 in which the stator includes a holding structure to which the stator poles are secured.

6. A machine as claimed in claim 5 in which each stator pole has a securing feature for interacting with a securing means to secure the stator pole to the holding structure.

7. A machine as claimed in claim 5 in which the holding structure substantially consists of non-magnetic material.

8. A machine as claimed in claim 1 in which torque generating flux paths through the stator are substantially limited to the stator poles.

9. A machine as claimed in claim 1 in which the rotor includes soft magnetic composite material.

10. A machine as claimed in claim 1 in which the stator poles include soft magnetic composite material.

11. A machine as claimed in claim 1 including a further rotor arranged for rotation relative to the stator about the axis and having a further inner rotor portion, which has further inner rotor poles projecting outwards from a further inner core portion, and a further outer rotor portion, which has a corresponding further outer rotor pole projecting inwards from a further outer core portion for each further inner rotor pole, thereby defining a further gap of circumferentially varying radial width between the further inner and outer rotor portions,
wherein the stator has further stator poles circumferentially disposed within the further gap, each further stator pole having an inner stator pole face facing the further inner rotor portion and an outer stator pole face facing the further outer rotor portion.

12. A machine as claimed in claim 11 in which the rotor and further rotor form a single rotor component.

13. A machine as claimed in claim 11 in which the inner and outer rotor portions are connected by a first end portion and the further inner and further outer rotor portion are connected by a second end portion, separate from the first end portion, to form two separate rotor components.

14. A machine as claimed in claim 13 in which one of the stator poles and a corresponding one of the further stator poles are defined by a single stator pole member.

15. A machine as claimed in claim 14 in which the stator pole member has an associated single winding for generating flux in the stator pole member.

16. A machine as claimed in claim 13 in which the rotor and further rotor are disposed in a fixed relationship relative to each other.

17. A machine as claimed in claim 13 in which the rotor and further rotor are rotatable relative to each other.

18. A machine as claimed in claim 11 in which corresponding rotor poles and further rotor poles are offset circumferentially with respect to each other.

19. A machine as claimed in claim 1 in which stator poles carrying a winding carry only a single winding.

20. A stator for a reluctance machine as claimed in claim 1 comprising a holding structure and one or more stator poles secured to the holding structure, wherein the stator poles each define an inner, radially inward facing pole face and an outer, radially outward facing pole face, in which the holding structure substantially consists of non-magnetic material.

* * * * *

UNITED STATES PATENT AND TRADEMARK OFFICE
CERTIFICATE OF CORRECTION

| | | |
|---|---|---|
| PATENT NO. | : 8,169,109 B2 | |
| APPLICATION NO. | : 12/722044 | |
| DATED | : May 1, 2012 | |
| INVENTOR(S) | : Paul Andrew Sykes et al. | |

It is certified that error appears in the above-identified patent and that said Letters Patent is hereby corrected as shown below:

In column 1, line 58, please change the word "energies" to "energise"

In column 4, line 4, please change the words "magnet sable" to "magnetisable"

In column 8, line 1, please change the words "magnet sable" to "magnetisable"

Signed and Sealed this
Twelfth Day of June, 2012

David J. Kappos
*Director of the United States Patent and Trademark Office*